July 17, 1951 — W. N. STARK — 2,560,665

DOOR SEAL FOR PRESSURIZED AIRCRAFT

Filed Feb. 25, 1946

INVENTOR.
WILLIAM N. STARK
BY Glenn Orlob
AGENT

Patented July 17, 1951

2,560,665

UNITED STATES PATENT OFFICE 2,560,665

DOOR SEAL FOR PRESSURIZED AIRCRAFT

William N. Stark, Kirkland, Wash., assignor to Boeing Airplane Company, a corporation of Delaware Application February 25, 1946, Serial No. 649,832

1 Claim. (Cl. 20—69)

My invention relates to a seal arrangement which provides an improved air and water seal between relatively moving parts of aircraft, boats, tanks, and other vehicles or like structures. It is particularly useful in providing an efficient door seal for pressurized aircraft.

In aircraft construction it is necessary that the airplane be provided with a number of hatches, doors, windshields and other parts which are required to be relatively movable with respect to the fixed body of the airplane. Under various flight conditions it is necessary that the gaps or joints between these relatively movable parts and the aircraft be sealed tightly against water or air leakage through the joint as well as against the passage of rain, snow, or ice formation. The provision of such sealed joints is particularly desirable in high altitude or substratosphere aircraft in which the interior of the occupied portions of the aircraft is pressurized or supercharged, thereby subjecting the joints to pressure differentials between the interior and the atmosphere.

The present invention is directed to the provision of an improved arrangement of seals inflated by the pressure differential existing between the outside atmosphere and an enclosure, such as a pressurized airplane cabin. The sealing medium may be supported on either the closure member or its frame, and is adapted to be inflated to provide a tight seal against the passage of water or air.

Seal arrangements are well known to the art which provide effective sealing surfaces on inwardly opening doors subjected to a differential pressure. However, door seals have been constructed in accordance with the instant invention which seal effectively even when installed on outwardly opening doors used to seal off pressurized compartments.

It is a major object of the present invention to provide for pressurized enclosures an inflatable seal of an improved design which will effectively seal large gaps or joints between a removable closure and its fixed support.

It is a further object to provide an efficient pneumatic seal for outwardly opening doors on pressurized aircraft. Such doors can be easily opened in an emergency even at high altitudes, and have other advantages.

It is a further object of the invention to provide an inflatable seal for doors and the like which will provide a rain-tight seal even when no pressure differential exists, and which will provide an effective seal despite frame deflections of considerable magnitude, while also accommodating all normal variations in the fit of the closure member and its frame due to manufacturing tolerances and the effects of wear.

It is also an object of the invention to provide a door closure which can be easily repaired or replaced.

Other objects and advantages of the present invention will become apparent to those skilled in the art after a reading of the present description and the accompanying drawings forming a part hereof, in which.

Figure 1:
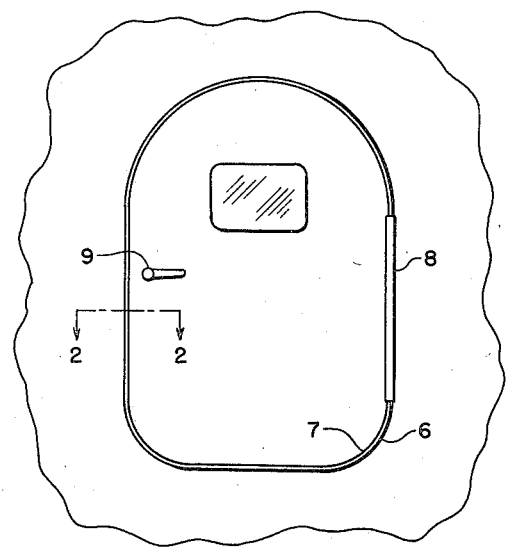
Figure 1 is an elevational view of an outwardly opening emergency exit door for a pressurized aircraft showing an application of the present invention.

Referring now to Figure 1, there is illustrated an outwardly opening door, such as an escape hatch for a pressurized airplane, which consists of a frame member 6 and a door or closure member 7, one of which supports a peripheral abutment element and the other of which supports a peripheral band of thin flexible material arranged to contact the peripheral abutment and effect a seal upon closure of the door. The closure member 7 may be supported on the frame 6 by the hinge 8, and may be opened by means of the latch 9.

Figure 2:
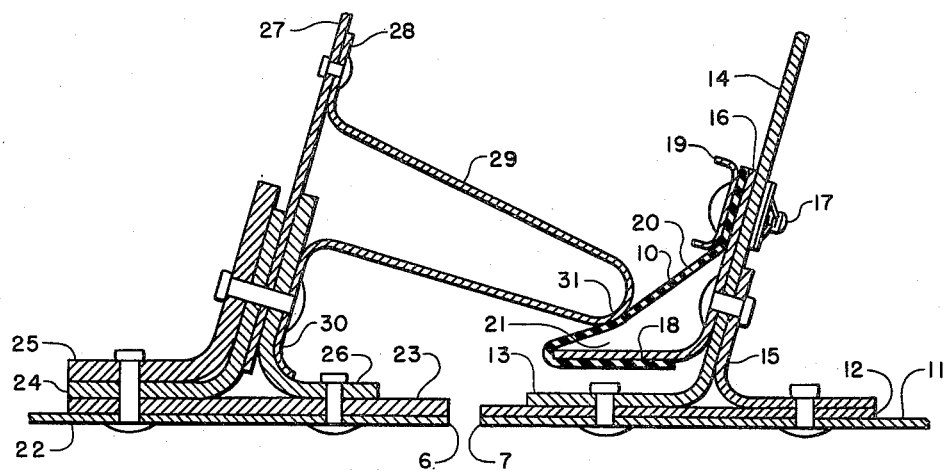
Figure 2 is a typical sectional view of the door seal taken along the line 2—2 of Figure 1.

Figure 2 illustrates a typical section of the preferred form of the invention in which a resilient sealing diaphragm 10 is supported on the closure member 7, so that the closure member 7 will open outwardly and eliminate the necessity of providing the clearances within the enclosure required for an inwardly swinging door. Such a door may be easily opened for emergency exit from an airplane or other pressurized enclosure without opposing the forces created by the differential pressure between the enclosure and the outside atmosphere.

The structure of the closure member 7 may be formed in various ways to support the diaphragm angle 16 on the web member 14. For example, the web member 14 may have a flange 13 secured by rivets to the door plate 12 and door panel 11. Additional structural support may be obtained by adding a reinforcing angle 15.

Fexible diaphragm 10 may be of natural rubber or of an artificial rubber composition which is capable of maintaining a live elastic condition for long periods. Diaphragm 10 is installed in a state of initial tension in sealing engagement with the extended flanges of the supporting angle 16 to form the interior pocket 21. Diaphragm 10 may be sealingly secured to the flanges of the angle 16 by various attaching means, such as the cemented joint 18 and the clamping action of an inverted channel 19 secured to the web member 14 by the bolts 17. A plurality of vent holes 20 may be provided in the diaphragm 10 adjacent to the channel 19, or through the angle 16 and its supporting structure for communicating the pocket 21 with the interior of the enclosure sealed off. The pocket 21 is thereby subjected to the higher of the differential pressures acting on the inner and outer surfaces of the closure member 7.

The structure of the frame member 6 may be formed in various ways to support the aperture frame member 29 on a frame web member 27. For example, the web member 27 may be secured by rivets to the fixed frame panel 22 and the frame plate 23 by the chord members 24, 25 and 26. The aperture frame member 29 is preferably of hat-shaped cross-section having flanges 28 and 30 secured to the frame web 27 by rivets or equivalent attaching means, and has a rounded crown portion 31.

Upon closure of the door, the rounded crown portion 31 of the aperture frame member 29 contacts the resilient diaphragm 10 to effect a raintight seal even though no pressure differential exists between the inside enclosure and the outside atmosphere. Whenever such a pressure differential does exist, as in a pressurized aircraft cabin having a pressure within an enclosure substantially higher than that of the surrounding outer atmosphere, the vents 20 allow the higher differential pressure to partially inflate the flexible diaphragm 10 to greatly increase the effectiveness of the seal adjacent to the point of contact between the diaphragm 10 and the aperture frame member 29. The location of the point of contact of the member 29 with the diaphragm 10 may vary within reasonable limits so as to compensate for variations due to manufacturing tolerances and the effects of wear without decreasing the effectiveness of the seal disclosed herein.

The forces required to cause proper engagement between the diaphragm and the frame member are, as a result of the flexible diaphragm construction, quite small, especially as compared with conventional seals comprising a gasket interposed between door and frame. Such conventional seals usually require the use of inwardly opening doors on pressurized aircraft in order that the pneumatic forces on the door act to increase the pressure on the gasket. Since the gasket is usually made quite thick and flexible in an effort to accommodate inaccuracies and deflections, the door frequently shifts bodily with respect to the airplane fuselage, so that it no longer lies flush with the fuselage skin. With the present construction it is possible to provide rigid mechanical support to retain the door in the position shown in the drawings, so that it cannot shift from its desired location, and destroy the aerodynamic smoothness of the craft.

It is recognized that the door seal arrangement disclosed herein may be modified by interchanging the position of the aperture frame member 29 with the diaphragm 10 and the supporting angle 16 so that the member 29 is supported on the closure member 7. The effectiveness of the seal between the member 29 and the diaphragm 10 will be improved by any differential pressure acting on the inside of the closure member 7 as long as the pocket 21 communicates with the higher differential pressure, and the seal disclosed herein may be used with equal effectiveness on enclosures which open outwardly or inwardly.

For the purposes of explaining the invention a particular embodiment thereof has been described in detail. It is recognized that many modifications can be made in the seal supporting structure, the particular shape of the aperture member 29, the form of the diaphragm supporting member 16, and the method of attaching the diaphragm 10 to the supporting member, without departing from the instant invention, and I do not intend to be limited to the particular construction shown herein except as such limitations are clearly imposed by the appended claim.

I claim:

A door arrangement for an enclosure comprising a frame member having a projecting peripheral contact element fixedly supported thereon, a movable closure member hinged on one side to said frame member, said closure member including a peripheral supporting angle fixedly secured thereto, a resilient diaphragm in a state of initial tension secured to opposite legs of said angle forming a pocket bounded by said angle and said diaphragm, said diaphragm being sealingly engageable with said contact element, and a vent communicating said pocket with the enclosure sealed by the engagement of said diaphragm and said contact means.

WILLIAM N. STARK.

REFERENCES CITED

The following references are of record in the file of this patent:

UNITED STATES PATENTS

| Number | Name | Date |
|---|---|---|
| 2,070,725 | Gail | Feb. 16, 1937 |
| 2,104,144 | Zand | Jan. 4, 1938 |
| 2,444,114 | Pevney | June 29, 1948 |

FOREIGN PATENTS

| Number | Country | Date |
|---|---|---|
| 728 | Great Britain | Mar. 20, 1860 |
| 484,095 | Germany | Oct. 10, 1929 |
| 144,240 | Switzerland | Mar. 2, 1931 |